United States Patent [19]

Graf et al.

[11] Patent Number: 5,155,164
[45] Date of Patent: Oct. 13, 1992

[54] PRODUCTS OF THE CONDENSATION OF PHENOLMONOSULFONIC ACIDS, DIHYDROXYDIPHENYL SULFONES, UREA AND FORMALDEHYDE

[75] Inventors: Hermann Graf, Mutterstadt; Adolf Stuebinger, Frankenthal; Klaus Lorenz, Worms; Ortwin Schaffer, Ludwigshafen; Karl Stork, Carlsberg, all of Fed. Rep. of Germany

[73] Assignee: BASF Aktiengesellschaft, Ludwigshafen, Fed. Rep. of Germany

[21] Appl. No.: 696,912

[22] Filed: May 8, 1991

[30] Foreign Application Priority Data

May 10, 1990 [DE] Fed. Rep. of Germany ....... 4014977

[51] Int. Cl.$^5$ .............................................. C08J 61/10
[52] U.S. Cl. ................................... 524/596; 525/534; 528/129; 528/137; 528/142; 528/143; 528/144; 528/145; 528/146; 528/150; 528/155; 528/162; 528/164
[58] Field of Search ............. 528/129, 137, 142, 143, 528/144, 145, 146, 150, 155, 162, 164; 525/534; 524/596

[56] References Cited

U.S. PATENT DOCUMENTS

| | | | |
|---|---|---|---|
| 2,129,554 | 10/1937 | Russell et al. | 149/5 |
| 2,242,681 | 2/1938 | Schafer et al. | 260/45 |
| 4,009,996 | 3/1977 | Wurmli | 8/94.24 |
| 4,592,940 | 6/1986 | Blyth et al. | 428/96 |

FOREIGN PATENT DOCUMENTS 1113457 2/1962 Fed. Rep. of Germany .
1137785 12/1968 United Kingdom .

*Primary Examiner*—John Kight, III
*Assistant Examiner*—Richard L. Jones
*Attorney, Agent, or Firm*—Oblon, Spivak, McClelland, Maier & Neustadt

[57] ABSTRACT

Products of the condensation of phenolmonosulfonic acids, dihydroxydiphenyl sulfones, urea and formaldehyde can be obtained by (A) preparing a homogeneous reaction mixture in sulfuric acid from the phenolmonosulfonic acid and dihydroxydiphenyl sulfone in the molar ratio of from 3:1 to 10:1, with the proviso that the water content of the mixture is not more than 10% of the total weight of the components, and the mixture contains from 0.3 to 1.5 moles of sulfuric acid per mole of dihydroxydiphenyl sulfone, at from 100° to 180° C., (B) subsequently, at from 40° to 90° C., carrying out a precondensation with 1 to 2 moles of formaldehyde and 0.5 to 1.5 moles of urea per mole of phenol units present in aqueous medium, (C) partially neutralizing the reaction mixture, (D) adding to the partially neutralized reaction mixture 0 to 0.5 mole of phenol per mole of phenol units present and then 0.1 to 0.8 mole of formaldehyde per mole of phenol units then present, (E) further condensing at from 40° to 90° C., (F) shifting the pH of the reaction mixture into the neutral range and (G) subsequently acidifying with a weak acid.

26 Claims, No Drawings

PRODUCTS OF THE CONDENSATION OF PHENOLMONOSULFONIC ACIDS, DIHYDROXYDIPHENYL SULFONES, UREA AND FORMALDEHYDE

The present invention relates to products of the condensation of phenolmonosulfonic acids, dihydroxydiphenyl sulfones, urea and formaldehyde, obtainable by A) preparing a homogeneous reaction mixture in sulfuric acid from the phenolmonosulfonic acid and dihydroxydiphenyl sulfone in the molar ratio of from 3:1 to 10:1, with the proviso that the water content of the mixture is not more than 10% of the total weight of the components, and the mixture contains from 0.3 to 1.5 moles of sulfuric acid per mole of dihydroxydiphenyl sulfone, at from 100° to 180° C., B) subsequently, at from 40° to 90° C., carrying out a precondensation with 1 to 2 moles of formaldehyde and 0.5 to 1.5 moles of urea per mole of phenol units present in aqueous medium, C) partially neutralizing the reaction mixture, D) adding to the partially neutralized reaction mixture 0 to 0.5 mole of phenol per mole of phenol units present and then 0.1 to 0.8 mole of formaldehyde per mole of phenol units then present, E) further condensing at from 40° to 90° C., F) shifting the pH of the reaction mixture into the neutral range and G) subsequently acidifying with a weak acid.

The present invention also relates to processes for preparing these condensation products and to the use thereof for tanning animal hides.

DE-B 1 113 457 relates to condensation products obtainable by reaction of sulfonated phenols which have no fused ring systems with urea and formaldehyde and subsequent treatment of the resulting condensates with phenols and formaldehyde. These condensation products are recommended, in particular, for tanning animal hides for producing lightfast leather with a light color (high white effect). However, the disadvantage of these agents for tanning hides is that the lightfastness of the tanned hides is not entirely satisfactory.

U.S. Pat. No. 4,592,940 relates to condensation products obtainable by reacting formaldehyde with diphenyl sulfones and phenolsulfonic acids. The disadvantage of these condensation products is that when they are used to tan hides, the fullness of the resulting leather is not entirely satisfactory.

It is an object of the present invention to provide synthetic aromatic condensation products (aromatic synthanes) which are suitable for tanning and, in particular, are suitable for producing white leathers with increased lightfastness and increased fullness.

We have found that this object is achieved by the condensation products defined in the first paragraph.

In reaction stage A, employed as phenolmonosulfonic acids are, preferably, pure p-phenolmonosulfonic acid or mixtures of p- and o-phenolsulfonic acid with an o-phenolsulfonic acid content of up to 20% of the weight of the mixture, and suitable dihydroxydiphenyl sulfones are, in particular, pure 4,4',-dihydroxydiphenyl sulfone and mixtures of 4,4',- and 2,4',-dihydroxydiphenyl sulfone with a 2,4',-dihydroxydiphenyl sulfone content of up to 20% of the weight of the mixture. The molar ratio of phenolmonosulfonic acids to dihydroxydiphenyl sulfones is preferably in the range from 3.5:1 to 5:1, particularly preferably in the range from 4:1 to 4.5:1, and 0.5 to 1 mole of sulfuric acid is advantageously employed per mole of dihydroxydiphenyl sulfone.

Stage A is advantageously carried out at from 120 to 160° C., whereas the reaction in stage B is preferably carried out at from 50° to 60° C. In stage B, preferably from 0.6 to 1 mole, in particular from 0.8 to 1 mole, of urea is added, while the amount of formaldehyde is preferably from 1.4 to 1.8 mole, and particularly preferably 1.6 to 1.8 mole, in each case per mole of phenol units present. The formaldehyde in stage B is expediently added as 30% by weight aqueous solution. In addition, it is advantageous to add the amount of water which is necessary to dissolve the added amount of urea in water under standard conditions. The formaldehyde is preferably added after the addition of urea and water. The condensation time should be not less than 0.5 and not more than 3 h. A reaction time of 2 to 2.5 h is particularly advantageous.

The amount of formaldehyde added per mole of phenol units present in stage D is preferably from 0.1 to 0.4 mole and particularly preferably 0.1 to 0.3 mole. In order to obtain agents for tanning leather with particularly high light-fastness, no phenol is used in stage D. However, the use of phenol in stage D is particularly advantageous when the tanning agents are required to produce, on the one hand, leather of increased lightfastness and fullness and, on the other hand, leather with advantageous mechanical properties, e.g. harder grained. In this case, the amount of phenol added per mole of phenol units present is preferably from 0.2 to 0.4 mole. The phenol addition preferably precedes the formaldehyde addition.

The further condensation in stage E is, in the case where no phenol has been added in stage D, preferably continued until the dynamic viscosity $\eta$ of the reaction mixture (measured at 50° C. with a rotation viscometer from Brookfield, Type LVT, spindle number LV2, at a rate of 12 revolutions per min using a 400 ml beaker with a diameter of 80 mm) has reached from 300 to 50 mPa.s. If phenol is added in stage D, this value increases to from 1000 to 4000 mPa.s, depending on the amount of phenol added. It is possible in this way to achieve residual phenol contents <0,1% by weight and residual contents of free formaldehyde <0.05% by weight based on the solids content. Further condensation is preferably carried out at from 50° to 60° C.

The partial neutralization in stage C, as well as the pH shift in stage F, is effected by adding bases, preferably using alkali metal hydroxides such as NaOH and ammonia, normally as aqueous solution. It is advantageous for the pH to be increased in the partial neutralization until addition of from 0.05 to 0.08 g of sodium hydroxide per gram of reaction mixture would result in a further increase in the pH to 7. The pH shift in stage F is preferably into the range pH 6 to pH 8 and particularly preferably into the range pH 7 to 7.5.

Subsequently, in stage G, the pH is reduced by adding weak acids (usually as aqueous solution), preferably to from 3 to 4.

Weak acids suitable for this are, inter alia, acetic acid, formic acid, oxalic acid, succinic acid, glutaric acid, adipic acid or citric acid. It is particularly advantageous to use water-soluble, high molecular weight polycarboxylic acids, which may have been partially neutralized, e.g. with alkali metal hydroxides. Examples of these are polymeric polycarboxylic acids such homo- or copolymers of αβ-monoethylenically unsaturated carboxylic acids containing from 3 to 6C atoms, such as acrylic and methacrylic acid, which preferably have a weight average molecular weight of 1500 to 15000. Suitable comonomers are, inter alia, acrylonitrile, methacrylonitrile, esters of acrylic or methacrylic acid with alkanols containing 1 to 10C atoms, acrylamide, methacrylamide, styrene or methyl vinyl ether. The molar proportion of carboxyl-containing monomers should usually be at least 20% of the total monomers constituting the copolymer. Also suitable as carboxyl-containing monomers are monoethylenically unsaturated anhydrides such as maleic anhydride. The high molecular weight polycarboxylic acids, which may be partially neutralized, are preferably added in amounts of from 1 to 5% of the dry weight of the reaction mixture.

If phenol is added in stage D, it is usually expedient on the industrial scale to melt stages D to F together and to carry out a cascade operation, in order to avoid the degree of condensation being too high because of the condensation reaction which normally takes place very quickly (10 to 20 min). This is done by following the phenol addition by adding only a portion of the formaldehyde, leaving the system to stir at from 40° to 90° C. for a short time, then raising the pH somewhat, adding further formaldehyde etc. until the required viscosity is reached. Of course, it is also possible to carry out a cascade operation without phenol addition.

Stage A is carried out in an advantageous manner by heating phenol with concentrated sulfuric acid, preferably 96% by weight, and/or oleum with an $SO_3$ content of from 20 to 65% by weight at from 100° to 180° C. for from 1 to 10, preferably 3 to 6, h, the molar ratio of phenol to total acid (calculated as sulfur trioxide) being from 1 to 1.2:1, preferably 1:1. In this case, the phenolmonosulfonic acids and the dihydroxydiphenyl sulfones are formed in situ. By-products which are also formed in minor amounts generally do not interfere with the subsequent reaction stages B to G and normally do not have an adverse effect on the product quality.

The exact composition of the reaction mixture can be determined, for example, by high-pressure liquid chromatography. Any deficiency of dihydroxydiphenyl sulfone which is found can be corrected by adding the appropriate amount from outside and stirring at from 100 to 180° C. until a homogeneous mixture is obtained. The amount of dihydroxydiphenyl sulfone formed in situ is influenced, for example, by the reaction temperature and the $SO_3$ content of the mixture. This is why the reaction is preferably carried out with oleum containing from 20 to 32% by weight $SO_3$ at from 150° to 180° C. To prepare the mixture of phenol and concentrated sulfuric acid and/or oleum which is to be heated to 100° to 180° C., it is expedient to add the acids dropwise to phenol at about 60° C., during which the mixture heats to about 90° to 100° C.

The aqueous mixtures, obtainable in this way, of the novel condensation products can, if required, be mixed with minor amounts of other additives such as agents for complexing metal ions with a valency greater than one, e.g. the alkali metal salts of ethylenediaminetetraacetic acid or of nitrilotriacetic acid or sodium polyphosphates. Their water content can also be modified as required. They are particularly suitable for tanning hides to give leather with a high white effect, increased lightfastness and increased fullness. In addition, the leather obtainable in this way has an increased heat resistance, completely satisfactory softness and an excellent colorability. The novel condensation products can also be used advantageously when leathers of all types, e.g. chrome-tanned hides, are alum retanned. This results in excellent leather of very light color and excellent lightfastness. It should also be emphasized that the novel condensation products are very compatible with other tanning agents, which makes it possible to use them in tanning mixtures, e.g. in aqueous solution together with chromium, aluminum, iron or zirconium tanning salts or mixtures thereof.

The aqueous mixtures, according to the invention, of the novel condensation products are temperature-resistant and have excellent storage stability. They can be converted, without diminishing their valuable properties, into the solid form by known drying processes such as evaporation under reduced pressure or drum or spray drying. Spray drying is preferred, with the inlet temperature expediently being 230 and the outlet temperature expediently being 105° C. An aqueous solution is used for tanning. This preferably contains from 20 to 30% by weight, based on the pelt weight, of condensation products according to the invention and, in the case of retanning, advantageously from 3 to 20% of the weight of the pretanned hide.

EXAMPLES

Example 1

Preparation of condensation products C1 to C12 according to the invention

C1 186 g of oleum (24% by weight $SO_3$) were continuously added over the course of 0.5 h to 197 g of phenol at 60° C., and the resulting mixture was heated at 160° C. for 3.5 h. Then, at 80° C., initially 80 g of water and 109 g of urea were stirred in and then 288 g of a 30% by weight aqueous formaldehyde solution were continuously added over the course of 2 h. 42 g of 50% by weight sodium hydroxide solution were added to the resulting mixture. Then, at 55° C., initially 50.5 g of phenol were stirred in, and then 41 g of a 30% by weight aqueous formaldehyde solution were added, and the reaction mixture was maintained at 55° C. for 10 min. The pH was then initially shifted into the range 7.3 to 7.5 by adding 100 g of 50% by weight sodium hydroxide solution and subsequently reduced to 3.7 by adding a solution of 70 g of a mixture containing succinic, glutaric and adipic acids in the ratio 1:1:1 by weight in 100 g of water. The mixture obtained after addition of 2 g of the sodium salt of ethylenediaminetetraacetic acid was spray-dried.

C2 372 g of oleum (24% by weight $SO_3$) were continuously added to 376 g of phenol at 60° C., and the resulting mixture was heated at 170° C. for 3 h. Then, at 80° C., initially 170 g of water and 238 g of urea were stirred in, and then 627 g of a 30% by weight aqueous formaldehyde solution were added over the course of 2 h. 70 g of 50% by weight sodium hydroxide solution were added to the resulting mixture. Then, at 55° C., initially 110 g of phenol were stirred in and then 90 g of a 30% by weight aqueous formaldehyde solution were added, and the reaction mixture was maintained at 55° C. for 10 min. The pH was then initially adjusted to 7.3 by adding 250 g of 50% by weight sodium hydroxide solution and subsequently reduced to 3.5 by adding equal parts by weight of a mixture containing succinic, glutaric and adipic acids in the ratio 1:1:1 by weight and of a 50% by weight aqueous solution of a polyacrylic acid with a weight average molecular weight of 2500. The mixture obtained after addition of 5 g of the sodium salt of ethylenediaminetetraacetic acid was spray-dried.

C3 As C2, but the addition of 110 g of phenol was followed initially by addition of only 45 g of aqueous formaldehyde solution. 5 min thereafter the pH was raised by adding 150 g of 50% by weight sodium hydroxide solution, and then the remaining 45 g of aqueous formaldehyde solution were added. After the odour of phenol had disappeared, 100 g of 50% by weight sodium hydroxide solution were added and then acidification was carried out with 100 g of a mixture containing succinic, glutaric and adipic acids in the ratio 1:1:1 by weight and 200 g of a 50% by weight aqueous solution of a polyacrylic acid with a weight average molecular weight of 2500. Finally, 5 g of the sodium salt of ethylenediaminetetraacetic acid were added, and the mixture was spray-dried.

C4 392 g of 96% by weight sulfuric acid were continuously added to 376 g of phenol at 60° C., and the resulting mixture was heated at 165° C. for 3 h. Then, at 75° C., initially 238 g of urea were stirred in and subsequently 627 g of a 30% by weight aqueous formaldehyde solution were added dropwise, and the mixture was maintained at 75° C. until a sample gave a clear solution in ten times the volume of water. 70 g of 50% by weight sodium hydroxide solution were added to the resulting mixture. Further condensation was carried out as for C3 but finally 140 g, not 100 g, of 50% by weight sodium hydroxide solution were added, and the acidification was with 110 g of a mixture containing succinic, glutaric and adipic acids in the ratio 1:1:1 by weight and 240 g of a 50% by weight aqueous solution of a polyacrylic acid with a weight average molecular weight of 2500. Finally, 5 g of the sodium salt of ethylenediaminetetraacetic acid were added, and the mixture was spray-dried.

C5 298 g of oleum (22% by weight SO$_3$) were added continuously to 301 g of phenol at 60° C., and the resulting mixture was heated at 160° C. for 3 h. Then, at 75° C., initially 135 g of water and 191 g of urea were added dropwise, and then, over the course of 2 h, 502 g of a 30% by weight aqueous formaldehyde solution. 54 g of 50% by weight sodium hydroxide solution were added to the resulting mixture. Then, at 60° C., initially 88 g of phenol were stirred in and then 36 g of a 30% by weight aqueous formaldehyde solution were added and, 10 min thereafter, 50 g of 50% by weight sodium hydroxide solution were added, and a further 36 g of a 30% by weight aqueous formaldehyde solution were added and, 10 min thereafter, 130 g of 50 % by weight sodium hydroxide solution were added. Finally, 4 g of the sodium salt of ethylenediaminetetraacetic acid and 110 g of a mixture containing succinic, glutaric and adipic acids in the ratio 1:1:1 by weight and 40 g of a 50% by weight aqueous solution of a polyacrylic acid with a weight average molecular weight of 2500 were stirred in, and the mixture was spray-dried.

C6 As for C5 up to and including stage F. Then 200 g of the reaction mixture were removed and acidified with 9.5 g of 60% by weight aqueous acetic acid and 4.5 g of 99% by weight formic acid, and finally the pH was adjusted to 3.5 by adding 2.4 g of 50% by weight sodium hydroxide solution, and the mixture was spray-dried.

C7 As for C6 but 300 g of the reaction mixture were removed, and the pH was adjusted to 3.7 by adding a mixture of 14.3 g of 60% by weight aqueous acetic acid, 3 g of 99 % by weight formic acid and 2.25 g of 50% by weight sodium hydroxide solution.

C8 392 g of 96% by weight sulfuric acid were added to 376 g of phenol, and the mixture was heated at 100° C. for 2 h. Then 155 g of a mixture of 4,4',-dihydroxydiphenyl sulfone and 2,4',-dihydroxydiphenyl sulfone (ratio about 9:1, from Yorkshire Chemicals, plc P.O. Box 6, Selby/North Yorkshire, England) were added, and the mixture was stirred at 135° C. until homogeneous. To this were added, at 70° C., initially 170 g of water and 239 g of urea and subsequently, over the course of 2 h, 468 g of a 30% by weight aqueous formaldehyde solution. Then 100 g of 50% by weight sodium hydroxide solution were added. Subsequently 110 g of phenol were stirred in at 60° C. and then 249 g of a 30% by weight formaldehyde solution were added, and the reaction mixture was maintained at 60° C. for 10 min. The pH was then initially raised by adding 150 g of 50% by weight sodium hydroxide solution and subsequently reduced to 3.5 by means of 165 g of a mixture containing succinic, glutaric and adipic acids in the ratio 1:1:1 by weight and 46 g of a polyacrylic acid with a weight-average molecular weight of 2500, which had been 30% neutralized with sodium hydroxide solution, and 5 g of the sodium salt of ethylenediaminetetraacetic acid were added, and the mixture was spray-dried.

C9 392 g of 96% by weight sulfuric acid were added to 376 g of phenol, and the mixture was heated at 165° C. for 3 h. Then 57 g of a mixture of 4,4'-dihydroxydiphenyl sulfone and 2,4'-dihydroxydiphenyl sulfone (ratio about 7:1, from Yorkshire Chemicals, plc P.O. Box 6, Selby/North Yorkshire, England) were added and the mixture was stirred at 140° C. until homogeneous. To this were added, at 70° C., initially 170 g of water and 239 g of urea and subsequently, over the course of 3 h, 67 g of 30% by weight aqueous formaldehyde solution. Then 100 g of 50% by weight sodium hydroxide solution were added. Subsequently, at 60° C., initially 110 g of phenol were stirred in and then successively 45 g of 30% by weight aqueous formaldehyde solution, 45 g of 50% by weight sodium hydroxide solution, 45 g of 30% by weight aqueous formaldehyde solution and 160 g of 50% by weight sodium hydroxide solution were stirred in, stirring between each addition until a homogeneous mixture was obtained. Acidification was carried out as for C8. Finally, 5 g of the sodium salt of ethylenediaminetetraacetic acid were added, and the mixture was spray-dried.

C10 As C5 but the sodium hydroxide solution was replaced by an equivalent amount of 25% by weight aqueous ammonia solution, and the acidification was carried out with 135 g of 60% by weight aqueous acetic acid and 82 g of 99% by weight aqueous formic acid.

C11 372 g of oleum (24% by weight SO$_3$) were continuously added over the course of 0.5 h to 376 g of phenol at 60° C., and the resulting mixture was heated at 160° C. for 3 h. Then, at 80° C., initially 170 g of water and 238 g of urea were stirred in and subsequently, over the course of 1 h, 627 g of a 30% by weight aqueous formaldehyde solution were added. The reaction mixture was then stirred (80° C.) until homogeneous. 90 g of 50% by weight sodium hydroxide solution were added to the resulting mixture. Then, at 60° C., initially 110 g of phenol were stirred in and then 45 g of a 30% by weight aqueous formaldehyde solution were added, and the reaction mixture was maintained at 60° C. for 15 min. Subsequently 55 g of 50% by weight sodium hydroxide solution were added and, after a further 5 min, another 45 g of 30% by weight aqueous formaldehyde solution were stirred in, and the reaction mixture was heated at 70° C. until the dynamic viscosity of a sample was 3000 mPa.s (at 50° C.). The pH was then increased by adding 173 g of 50% by weight sodium hydroxide solution and subsequently acidified by adding 200 g of a mixture containing succinic, glutaric and adipic acids in the ratio 1:1:1 by weight and 76 g of a 33% by weight aqueous solution of a polyacrylic acid (weight average molecular weight 15000). Addition of 5 g of the sodium salt of ethylenediaminetetraacetic acid was followed by spray-drying.

C12 178 g of oleum (24% by weight SO$_3$) were continuously added over the course of 0.5 h to 180 g of phenol at 60° C., and the resulting mixture was heated at 160° C. for 3 h. Then, at 70° C., initially 81 g of water and 114 g of urea and then, over the course of 1 h, 300 g of 30% by weight aqueous formaldehyde solution were added. The reaction mixture was then stirred (70° C.) until homogeneous. 257 g of 50% by weight sodium hydroxide solution were added to the resulting mixture. Then, at 65° C., 11 g of a 30% by weight aqueous formaldehyde solution were added, and the mixture was stirred until the dynamic viscosity of a sample was 325 mPa.s (50° C.).

Subsequently the pH was raised using 40 g of 50% by weight sodium hydroxide solution and then acidified using 23 g of a 54% by weight aqueous solution of a polyacrylic acid with a weight average molecular weight of 2500, which had been 30% neutralized with sodium hydroxide, and 110 g of a mixture containing succinic, glutaric and adipic acids in the ratio 1:1:1 by weight. Finally, 2.5 g of the sodium salt of ethylenediaminetetraacetic acid were added, and the mixture was spray-dried.

Example 2

Use of condensation products according to the invention from Example 1 for tanning hides (percentage data always mean % by weight)

a) Drum-dyed shoe upper leather

A cowhide wet blue of shaved thickness 1.8 mm was, as usual in the tannery, rinsed, washed and then freed of acid in 200% liquor (water at 40° C.) with sodium bicarbonate and sodium formate to pH 4.5. Retanning was then carried out in a new liquor (100%, 40° C.) containing 8% C1. After drumming for 40 min, the leather was rinsed again and, in 100% liquor (50° C.) as usual in the tannery, dyed, fatliquored and adjusted to pH 4.0 with formic acid. After brief rinsing, the leather was stored overnight, then set out, dried and staked. The result was well-filled, soft leather with a close-lying smooth grain and little lightening of color.

b) White shoe upper leather

A cowhide wet blue of shaved thickness 1.6 mm was washed and freed of acid to pH 4.5 as in a). It was then drummed in 100% liquor containing 3% of a commercial polymeric tanning agent based on acrylic acid for 40 min and then, in the same liquor, 6% C1 were added and retanning was carried out for a further 40 min. The leather was briefly rinsed and then treated with 6% of a commercial synthetic (lightfast) fatliquor and fixed with formic acid.

The leather obtained after drying and staking had a high degree of whiteness in addition to good fullness. In addition, it displayed high lightfastness and good heat-resistance. It was possible for the leather obtained in this way to be dyed and finished as usual in the tannery.

c) As b) but C1 was replaced by C2. The leather obtained was likewise well-filled and soft and had a high degree of whiteness and good lightfastness and heat-resistance. It was possible for the leather obtained in this way to be dyed and finished as usual in the tannery.

d) As b) but C1 was replaced by C4. The leather obtained was well-filled and soft and had a high degree of whiteness and good lightfastness and heat-resistance. It was possible for the leather obtained in this way to be dyed and finished as usual in the tannery.

e) As b) but C1 was replaced by C8. The leather obtained was well-filled and had a high degree of whiteness and good lightfastness and heat-resistance. It was possible for the leather obtained in this way to be dyed and finished as usual in the tannery.

f) As b) but C1 was replaced by C9. The leather obtained was well-filled and had a high degree of whiteness and good lightfastness and heat-resistance. It was possible for the leather obtained in this way to be dyed and finished as usual in the tannery.

We claim:

1. A product of the condensation of a phenolmonosulfonic acid, a dihydroxydiphenyl sulfone, urea and formaldehyde, obtained by A) preparing a homogeneous reaction mixture in sulfuric acid from the phenolmonosulfonic acid and dihydroxydiphenyl sulfone in the molar ratio of from 3:1 to 10:1, with the proviso that the water content of the mixture is not more than 10% of the total weight of the components, and the mixture contains from 0.3 to 1.5 moles of sulfuric acid per mole of dihydroxydiphenyl sulfone, at from 100° to 180° C., B) subsequently, at from 40° to 90° C., carrying out a precondensation with 1 to 2 moles of formaldehyde and 0.5 to 1.5 moles of urea per mole of phenol units present in aqueous medium, C) partially neutralizing the reaction mixture, D) adding to the partially neutralized reaction mixture 0 to 0.5 mole of phenol per mole of phenol units present and then 0.1 to 0.8 mole of formaldehyde per mole of phenol units then present, E) further condensing at from 40° to 90° C., shifting the pH of the reaction mixture into the F) shifting the pH of the reaction mixture into the neutral range and G) subsequently acidifying with a weak acid.

2. A condensation product as claimed in claim 1, obtained by carrying out stage A in such a way that phenol is heated with concentrated sulfuric acid, with oleum with an SO₃ content of from 20 to 65% by weight, or with a mixture of sulfuric acid and oleum with an SO₃ content of from 20 to 65% by weight, at from 100 to 180° C. for from 1 to 10 h, the molar ratio of phenol to total sulfuric acid, calculated as sulfur trioxide, being from 1 to 1.2:1.

3. A condensation product as claimed in claim 2, obtained by carrying out the reaction in stage A with oleum with an SO₃ content of from 20 to 32% by weight at from 150 to 180° C.

4. A condensation product as claimed in claim 1, obtained by the molar ratio of phenolmonosulfonic acid to dihydroxydiphenyl sulfone being in the range from 3.5:1 to 5:1.

5. A condensation product as claimed in claim 1, obtained by the amount of urea added in stage B per mole of phenol units present being from 0.6 to 1 mole.

6. A condensation product as claimed in claim 1, obtained by the amount of formaldehyde added in stage B per mole of phenol units present being from 1.4 to 1.8 moles.

7. A condensation product as claimed in claim 1, obtained by condensation in stage B at from 50° to 60° C. for from 0.5 to 3 h.

8. A condensation product as claimed in claim 1, obtained by raising the pH in the partial neutralization in stage C until the addition of 0.05 to 0.08 g of sodium hydroxide per gram of reaction mixture would increase the pH further to 7.

9. A condensation product as claimed in claim 1, obtained by not adding phenol in stage D.

10. A condensation product as claimed in claim 1, obtained by adding from 0.2 to 0.4 mole of phenol per mole of phenol units present in stage D.

11. A condensation product as claimed in claim 1, obtained by adding from 0.1 to 0.4 mole of formaldehyde per mole of phenol units present in stage D.

12. A condensation product as claimed in claim 1, obtained in the case where no phenol has been added in stage D by carrying out further condensation until the dynamic viscosity of the reaction mixture measured at 50° C. has reached from 300 to 350 mPa.s.

13. A condensation product as claimed in claim 1, obtained in the case where phenol has been added in stage D by carrying out further condensation until the dynamic viscosity of the reaction mixture measured at 50° C. has reached from 1000 to 4000 mPa.s.

14. A condensation product as claimed in claim 1, obtained by shifting the pH into the range from 6 to 8 in stage F.

15. A condensation product as claimed in claim 1, obtained by reducing the pH to from 3 to 4 in stage G.

16. A condensation product as claimed in claim 1, obtained by using for the acidification in stage G a water-soluble high molecular weight unneutralized acid or partially neutralized polycarboxylic acid.

17. A condensation product as claimed in claim 1, obtained by following stage F by converting the aqueous mixture by drying processes into the solid form.

18. A condensation product as claimed in claim 1, obtained in the case where phenol is added in stage D by melting together stages D to F and carrying out a cascade operation.

19. A method for tanning animal hides, which comprises applying to said animal hides condensation products as claimed in claim 1.

20. A method for the alum retanning of leather, which comprises alum retanning said leather with condensation products as claimed in claim 1.

21. A condensation product as claimed in claim 1, wherein the homogenous reaction mixture of stage A consists essentially of said phenolmonosulfonic acid and dihydroxyphenyl sulfone in sulfuric acid.

22. A process for preparing a condensation product as claimed in claim 1, which comprises A) preparing a homogeneous reaction mixture in sulfuric acid from the phenolmonosulfonic acid and dihydroxy diphenyl sulfone in the molar ratio of from 3:1 to 10:1, with the proviso that the water content of the mixture is not more than 10% of the total weight of the components, and the mixture contains from 0.3 to 1.5 moles of sulfuric acid per mole of dihydroxydiphenyl sulfone, at from 100° to 180° C., B) subsequently, at from 40° to 90° C., carrying out a precondensation with 1 to 2 moles of formaldehyde and 0.5 to 1.5 moles of urea per mole of phenol units present in aqueous medium, C) partially neutralizing the reaction mixture, D) adding to the partially neutralized reaction mixture 0 to 0.5 mole of phenol per mole of phenol units present and then 0.1 to 0.8 mole of formaldehyde per mole of phenol units then present, E) further condensing at from 40° to 90° C., F) shifting the pH of the reaction mixture into the neutral range and G) subsequently acidifying with a weak acid.

23. A process as claimed in claim 22, wherein stage A is carried out in such a way that phenol is heated with concentrated sulfuric acid, with oleum with an SO₃ content of from 20 to 65% by weight, or with a mixture of sulfuric acid and oleum with an SO₃ content of from 20 to 65 % by weight, at from 100° to 180° C. for from 1 to 10 h, the molar ratio of phenol to total sulfuric acid, calculated as sulfur trioxide, being from 1 to 1.2:1.

24. A process as claimed in claim 19, wherein the homogenous reaction mixture of stage A consists essentially of said phenolmonosulfonic acid and dihydroxyphenyl sulfone in sulfuric acid.

25. A process as claimed in claim 19, obtained by carrying out the reaction in stage A at from 150°–180° C.

26. A process as claimed in claim 24, obtained by carrying out the reaction in stage A at from 150°–180° C.

* * * * *